United States Patent
Pace et al.

(10) Patent No.: US 8,456,518 B2
(45) Date of Patent: Jun. 4, 2013

(54) STEREOSCOPIC CAMERA WITH AUTOMATIC OBSTRUCTION REMOVAL

(75) Inventors: Vincent Pace, Shadow Hills, CA (US); Patrick Campbell, Stevenson Ranch, CA (US)

(73) Assignee: James Cameron & Vincent Pace, Burbank, CA (US)

( * ) Notice: Subject to any disclaimer, the term of this patent is extended or adjusted under 35 U.S.C. 154(b) by 540 days.

(21) Appl. No.: 12/752,100

(22) Filed: Mar. 31, 2010

(65) Prior Publication Data

US 2011/0242286 A1 Oct. 6, 2011

(51) Int. Cl.
*H04N 15/00* (2006.01)

(52) U.S. Cl.
USPC .............. 348/47; 348/46; 348/43; 348/51; 348/42

(58) Field of Classification Search
USPC .................... 348/47, 46, 43, 51, 42
See application file for complete search history.

(56) References Cited

U.S. PATENT DOCUMENTS

| | | | |
|---|---|---|---|
| 5,162,897 A | 11/1992 | Jitsukata et al. | |
| 6,369,952 B1 | 4/2002 | Rallison et al. | |
| 6,678,394 B1 | 1/2004 | Nichani | |
| 7,161,616 B1 * | 1/2007 | Okamoto et al. | 348/148 |
| 7,190,389 B1 | 3/2007 | Abe et al. | |
| 7,218,757 B2 | 5/2007 | Franz | |
| 7,526,718 B2 | 4/2009 | Samadani et al. | |
| 7,899,321 B2 | 3/2011 | Cameron et al. | |
| 2003/0165268 A1 * | 9/2003 | Franz | 382/181 |
| 2007/0126863 A1 | 6/2007 | Prechtl et al. | |
| 2007/0285509 A1 * | 12/2007 | Lee | 348/43 |
| 2009/0180682 A1 | 7/2009 | Camus | |
| 2009/0237491 A1 * | 9/2009 | Saito | 348/47 |
| 2010/0026809 A1 | 2/2010 | Curry | |
| 2010/0194972 A1 * | 8/2010 | Matsuzawa et al. | 348/349 |

OTHER PUBLICATIONS

World Intellectual Property Organization, International Search Report and Written Opinion for International Application No. PCT/US2011/030810, mail date Jul. 5, 2011, pp. 1-10.

Dhond et al., Stereo Matching in the Presence of Narrow Occluding Objects Using Dynamic Disparity Search, IEEE transactions on Pattern Analysis and Machine Intelligence vol. 17, No. 7, Jul. 1995, journal, pp. 719-724.

* cited by examiner

*Primary Examiner* — Shawn An

(74) *Attorney, Agent, or Firm* — SoCal IP Law Group LLP; Steven C. Sereboff; John E. Gunther

(57) ABSTRACT

There is disclosed a stereographic camera system, a computing device and a method of operating a stereographic camera system. The stereoscopic camera system may a left camera and a right camera and an obstruction detector to determine whether or not a field of view of one of the left camera and the right camera is at least partially obstructed. A controller may cause the camera system to automatically output only non-obstructed image data, in response to a determination by the obstruction detector that a field of view of one of the left camera and the right camera is at least partially obstructed.

18 Claims, 9 Drawing Sheets

STEREOSCOPIC CAMERA WITH AUTOMATIC OBSTRUCTION REMOVAL

BACKGROUND

1. Field

This disclosure relates to camera systems and specifically to camera systems including a stereographic camera.

2. Description of the Related Art

Humans view the environment three-dimensionally using binocular vision. Binocular vision is both a visual system and an analytical system. Our brain perceives both distance and speed based, in part, on triangulating visual light information received by the retinas of our respective laterally separated, forward facing eyes. Since both eyes are forward facing, the fields of view of each of our eyes overlap, with each eye perceiving a slightly different perspective of the same area. As we focus on objects closer to our eyes, our eyes rotate towards each other. As we focus on distant objects, our eyes rotate towards a parallel view. The angle between the lines of sight of each eye is commonly termed the convergence angle. The convergence angle is higher when we view objects closer to our eyes and lower when viewing distance object. The convergence angle may be essentially zero, indicating essentially parallel lines of sight, when we view objects at great distance.

Three dimensional (3D) imaging, also known as stereographic imaging, dates at least as far back as 1838. Historically, stereographic cameras commonly include two lenses spaced laterally apart a similar distance as an average human's eyes, approximately 65 mm. The effective distance of the lenses from each other is known as the interocular distance. The interocular distance has a strong effect on the apparent depth of a stereographic image. Increasing the interocular spacing increases the apparent depth of a stereographic image. Decreasing the interocular spacing has the effect of decreasing the apparent depth of a stereographic image.

The presentation of stereoscopic images is commonly achieved by providing a first image to be seen only by the left eye and a second image to be seen only by the right eye. Differences, or disparity, between the two images may provide an illusion of depth. Two images having disparity may be perceived as three-dimensional. Two images, or portions of two images, exhibiting excessive disparity may not be perceived as three-dimensional, but may simply be seen as two overlapping two-dimensional images. A variety of techniques, including polarization, filters, glasses, projectors, and shutters have been used to restrict each eye to viewing only the appropriate image.

One approach to displaying stereographic images is to form the left-eye image on a viewing screen using light having a first polarization state and to form the right-eye image on the same viewing screen using light having a second polarization state orthogonal to the first polarization state. The images may then be viewed using glasses with polarizing lenses such that the left eye only receives light of the first polarization state and the right eye only receives light of the second polarization state. Stereoscopic displays of this type typically project the two polarized images onto a common projection screen. This technique has been used to present 3D movies.

A second approach to displaying stereographic images is to form the left-eye and right-eye images alternately on a common viewing screen at a high rate. The images may then be viewed using shutter glasses that alternately occult either the right or left eye in synchronism with the alternating images.

Throughout this description, elements appearing in schematic views and block diagrams are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

Elements that have similar functions for either the left or right eyes are assigned the same reference designator with a suffix of either "L" or "R" to indicate left-eye or right-eye, respectively. Elements that have the same function may be assigned the same reference designator followed by a hyphen and a numerical suffix.

DETAILED DESCRIPTION

In this disclosure, the term "data" is intended to include digital data, commands, instructions, digital signals, analog signals, optical signals and any other format for communicating quantitative or qualitative information. The term "automatically" means "without operator involvement".

The term "capture" means to convert a portion of a scene into data which may be, for example, recorded or transmitted. The term "line of sight" means a line connecting a viewer and an object to be viewed; when applied to a camera, the "line of sight' is synonymous with the optical axis of the camera. The term "pan angle" has the usual meaning of a rotation angle in a horizontal plane between a line of sight of a camera and a predetermined datum. The term "tilt angle" has the usual meaning of a rotation angle in a vertical plane between a line of sight of a camera and a horizontal plane.

The term "field of view" means a portion of scene captured by a camera at any given instant. The field of view is defined, in part, by the pan and tilt angles and the focal length of a lens or lenses within the camera. The field of view is centered upon the line of sight of the camera. The term "field of regard" means the entire extent of the scene that may be captured by a camera or viewed by a spectator. For example, when a camera is used to capture an athletic event or performance, the field of regard may be an entire playing field or court where the athletic event occurs or an entire stage where the performance occurs.

Description of Apparatus

Figure 1:
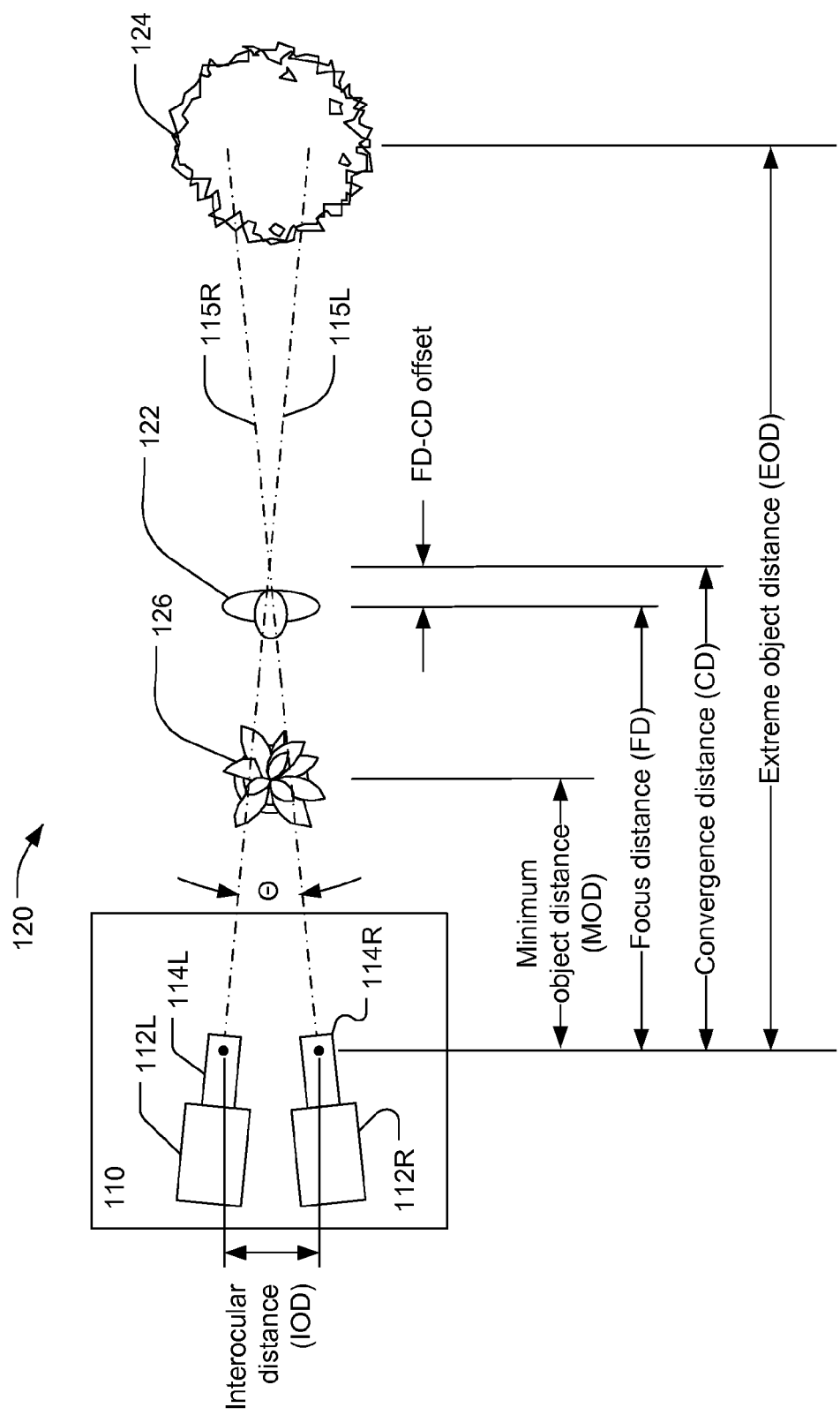
FIG. 1 is a schematic view of a stereographic camera in an environment.

Referring now to FIG. 1, a stereographic camera 110 may include a left camera 112L and a right camera 112R. The term "camera" is intended to include any device having an optical system to form an image of an object and a medium to receive and detect and/or record the image. The left and right cameras 112L, 112R may be film or digital still image cameras, may be film or digital motion picture cameras, or may be video cameras. Each of the left and right cameras 112L, 112R may include a lens 114L, 114R. The term "lens" is intended to include any image-forming optical system and is not limited to combinations of transparent refractive optical elements. A lens may use refractive, diffractive, and/or reflective optical elements and combinations thereof. Each lens may have an axis 115L, 115R that defines the center of the field of view of each camera 112L, 112R.

The left and right cameras 112L, 112R may be separated by an interocular distance IOD. The cameras 112L, 112R may be disposed such that the axis 115L, 115R are parallel or such that a stereo convergence angle Θ is formed between the two axis 115L, 115R. The cameras 112L, 112R may be disposed such that the axis 115L, 115R cross at a stereo convergence distance CD from the cameras. The interocular distance IOD, the stereo convergence distance CD, and the stereo convergence angle Θ are related by the formula $$\Theta = 2\tan^{-1}\left(\frac{IOD}{2CD}\right), \quad (1)$$

or $$CD = \frac{IOD}{2\tan(\Theta/2)}. \quad (2)$$

The interocular distance IOD and the stereo convergence distance CD may be measured from a nodal point within the lenses 114L, 114R. The nodal points may be, for example, the centers of the entrance pupils of the respective lens 114L, 114R.

The stereographic camera 110 may be used to form a stereographic image of a scene 120 composed of a plurality of scene elements or objects at different distances from the stereographic camera. As shown in the simplified example of FIG. 1, the scene 120 may include a primary object 122, which is shown, for example, as a person. The scene 120 may include other objects in the background (behind the primary subject 122), such as the tree 124. The scene 120 may also include other objects in the foreground (between the camera and the primary subject 122), such as the plant 126. A distance from the stereographic camera 110 to the furthest background object may be defined as the extreme object distance EOD. A distance from the stereographic camera 110 to the closest foreground object may be defined as the minimum object distance MOD.

When the images from a stereographic camera, such as the stereographic camera 110, are displayed on a viewing screen, scene objects at the convergence distance CD will appear to be in the plane of the viewing screen. Scene objects, such as the primary subject 122 in the example of FIG. 1, located closer to the stereographic camera than the convergence distance CD may appear to be in front of the viewing screen. Scene objects, such as the tree 116, located further from the stereographic camera than the convergence distance CD may appear to be behind the viewing screen.

Each lens 114L, 114R may have adjustable focus. The lenses 114L, 114R may be focused at a common adjustable focus distance FD. The focus distance FD may be adjusted manually or may be automatically adjusted. The focus distance FD may be adjusted such that the cameras 112L, 112R are focused on the primary subject 122. The focus distance FD may be automatically adjusted in response to a sensor (not shown) that determines the distance from the cameras 112L, 112R to the primary subject 122. The sensor to determine the distance from the cameras to the primary subject 122 may be an acoustic range finder, an optical or laser range finder, or some other distance measuring device. In the case where the cameras 112L, 112R are digital still image, motion picture, or video cameras, the focus distance FD may be adjusted in response to one or more processors (not shown) that analyze one or both of the images sensed by the cameras. The processors may be located within or may be coupled to the cameras.

The convergence distance CD and the focus distance FD may commonly be set to the same distance, which may be the distance from the cameras 112L, 112R to the primary subject 122. However, as shown in FIG. 1, the convergence distance CD and the focus distance FD may not be the same distance. For example, the focus distance FD may be set at the distance from the cameras to the primary subject 122 and the convergence distance CD may be set slightly longer than the focus distance. In this case, when the images are displayed, the primary subject 122 will be seen to be in front of the plane of the viewing screen.

Each lens 114L, 114R may also have zoom capability, which is to say that the focal length FL of each lens may be adjusted. The focal lengths $FL_L$, $FL_R$ of the lenses 114L, 114R may be adjusted manually or automatically. The focal lengths $FL_L$, $FL_R$ of the lenses 114L, 114R may be adjusted synchronously such that focal lengths $FL_L$, $FL_R$ of the lenses are precisely the same at all times. The focal lengths $FL_L$, $FL_R$ of the lenses 114L, 114R may be adjustable over a predetermined continuous range of focal lengths.

The human eye is essentially a camera having a lens and an image sensor in the form of the retina of the eye. The lens projects an image of an outside scene onto the retina, which converts the image into electrical impulses for analysis by the brain. Since a person's eyes are separated by an interocular distance, the images formed on the two retinas are slightly different. The difference between the two images, commonly referred to as stereopsis or retinal disparity, is an important factor in depth perception. Other factors contributing to depth perception include the convergence angle between the lines of sight of the two eyes, accommodation or the distance at which the eyes are focused, and parallax, perspective, and other shape cues present in the scene.

Figure 2:
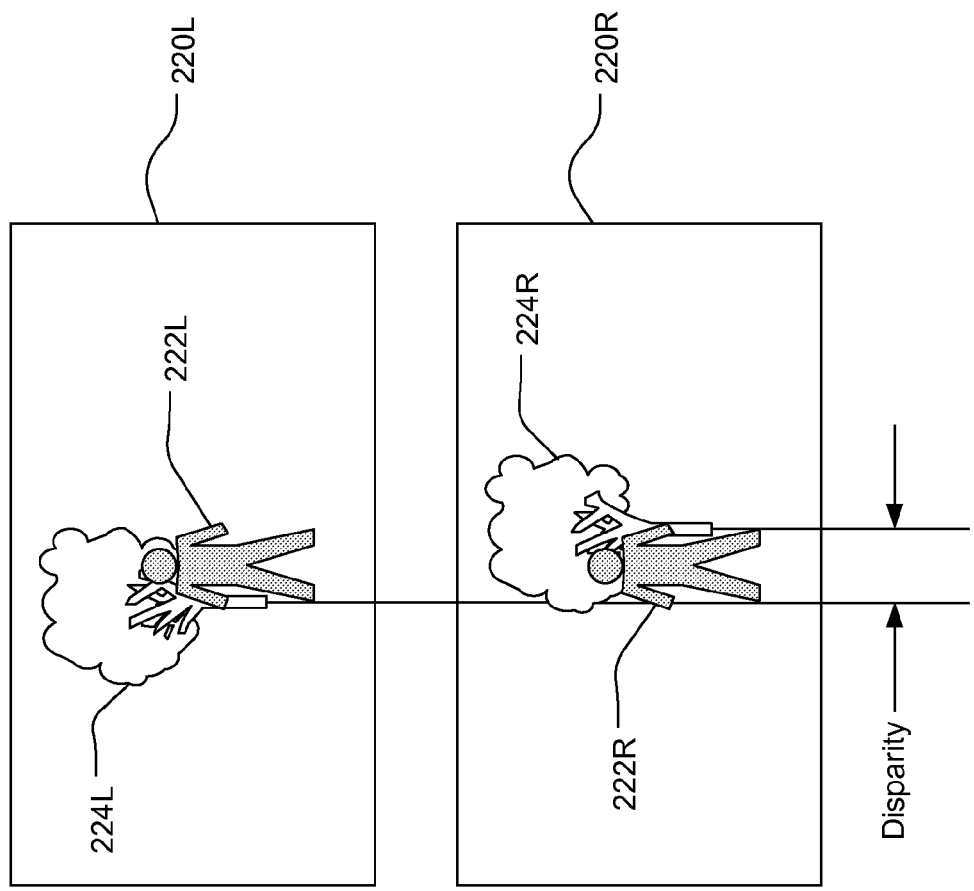
FIG. 2 is a representation of images captured by a stereographic camera.

As shown in FIG. 2, a stereographic display mimics natural depth perception by presenting different images to the left and right eyes. An exemplary image captured by a left camera is illustrated as displayed on a screen 220L and an exemplary image captured by a right camera is illustrated as displayed on a second screen 220R. The image displayed on the screen 220L includes an image 222L of a primary subject near the center of the display screen, and an image 224L of an extreme background object to the left of the image 222L. The image displayed on screen 220R includes an image 222R of the primary subject near the center of the display screen, and an image 224R of the extreme background object to the right of the image 222R.

In this disclosure, the positional difference between corresponding objects in the left and right display images will be referred to as "disparity". In the example of FIG. 2, the largest disparity occurs between the images 224L, 224R of the extreme background object. The disparity between corresponding objects in the left image 220L and the right image 220R may provide an illusion of depth when the two images are viewed separately by the left and right eyes of an observer. However, both the images 220L and 220R are located at the plane of the display screen and are invariant with respect to the viewer's head position. Thus a viewer receives somewhat conflicting information from a stereographic image—the binocular disparity present in the images indicates depth, but the constant focus distance and lack of parallax indicate the absence of depth. Viewers may not be able to properly fuse objects displayed with disparity greater than a limit value, which may be both viewer-dependent and image-dependent. For example, viewers may perceive scene objects displayed with disparity greater than the limit value as two separate items in the plane of the viewing screen, which may be disconcerting and disruptive to perceiving the rest of the stereographic image. In addition, viewers may have to consciously intervene in the perception process (for example, by forcing their eyes to cross) to fuse scene objects displayed with disparity greater than the limit value.

To preserve a comfortable illusion of depth, a stereographic image may be captured or generated in a manner that constrains disparity to less than a predetermined maximum disparity. For example, the disparity within a stereographic image may be controlled by adjusting an interocular distance of the stereographic camera used to capture the image. The interocular distance may be controlled automatically as a scene or event is captured, as described in copending patent application Ser. No. 12/578,488, entitled Stereo Camera With Automatic Control of Interocular Distance. The interocular distance may be controlled by an operator in real time, or may be predetermined and fixed during the capture of a scene or event.

Figure 3:
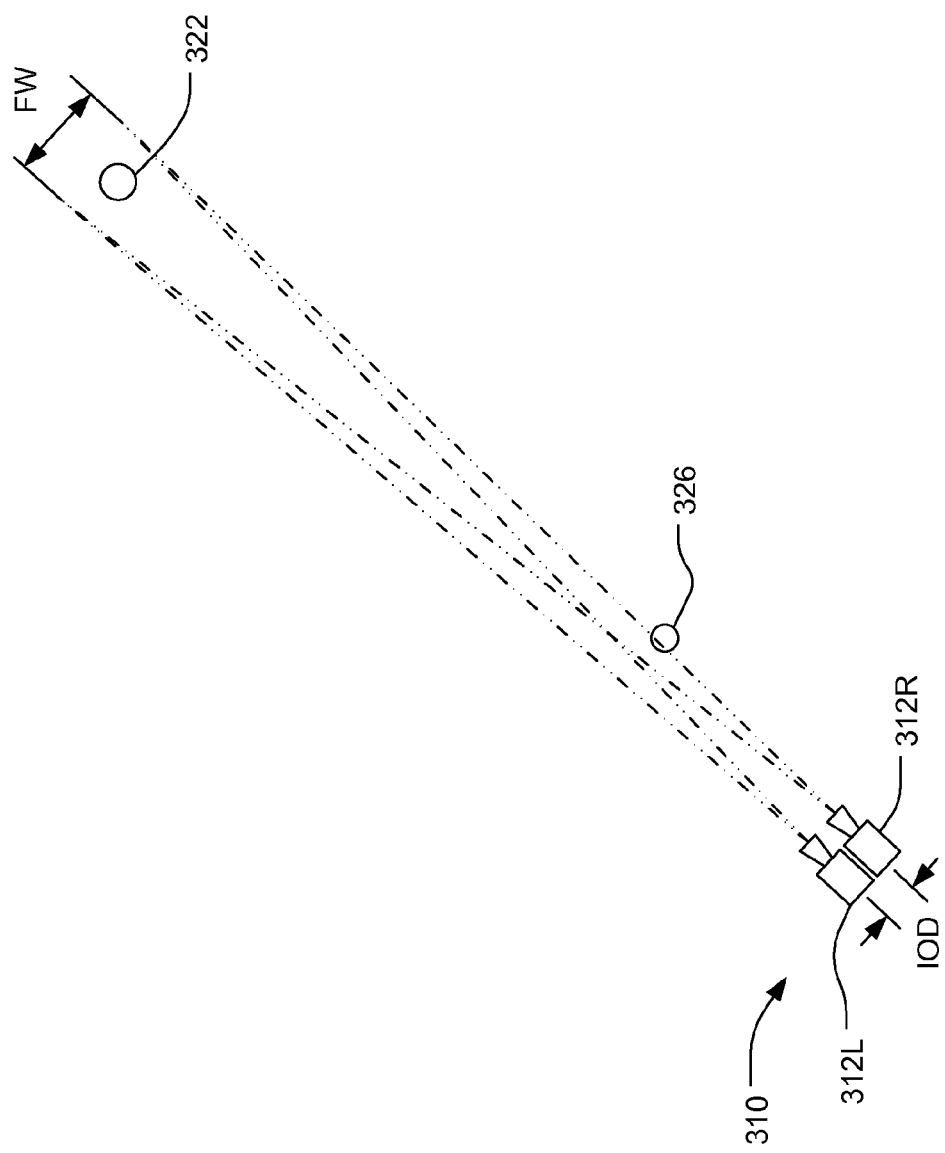
FIG. 3 is a schematic view of a stereographic camera in an environment.

Referring now to FIG. 3, a stereographic camera 310, which may be the stereographic camera 110, may be used to capture live events such as sporting events. The stereographic camera 310 may be, for example, capturing a scene including a primary object 322 such as an athlete. The focal lengths of the lenses $FL_L$, $FL_R$ within the stereographic camera may be set to define an image frame inclusive of the primary object 322. In the top view of FIG. 3, a width of the image frame is indicated by a dimension FW.

The stereographic camera 310 may include a left camera 312L and a right camera 312R. An interocular distance IOD between the left camera 312L and the right camera 312R may be set to provide a pleasing stereographic effect without introducing objectionably large disparity between the left and right images captured by the stereographic camera. The IOD may be predetermined and fixed. The IOD may be set in near-real time by an operator, such as a video engineer, observing the images from the stereographic camera 310. The IOD may be automatically determined from the operating parameters of the stereographic camera and the scene characteristics as previously described.

When a stereographic camera is used to capture a live event, such as a sporting event, a foreground object 326 may move relative to the stereographic camera 310 such that the foreground object may spontaneously obstruct a portion of field of view of the one of the cameras 312L, 312R without intruding into the field of view of the other camera. In the example of FIG. 3, an object 326 obstructs part of the field of view of the camera 312R. The object 326 may be for example, an athlete, spectator, or other person who runs or walks into the field of view. The object 326 may be, for further example, a stationary person or other object that enters the field of view as an operator of the stereographic camera 310 pans or rotates the camera to track movements of the primary object 322. In this situation, the intrusion of the object 326 into the field of view of only one camera may be disconcerting and disruptive to viewers of the captured stereographic image.

Figure 4:
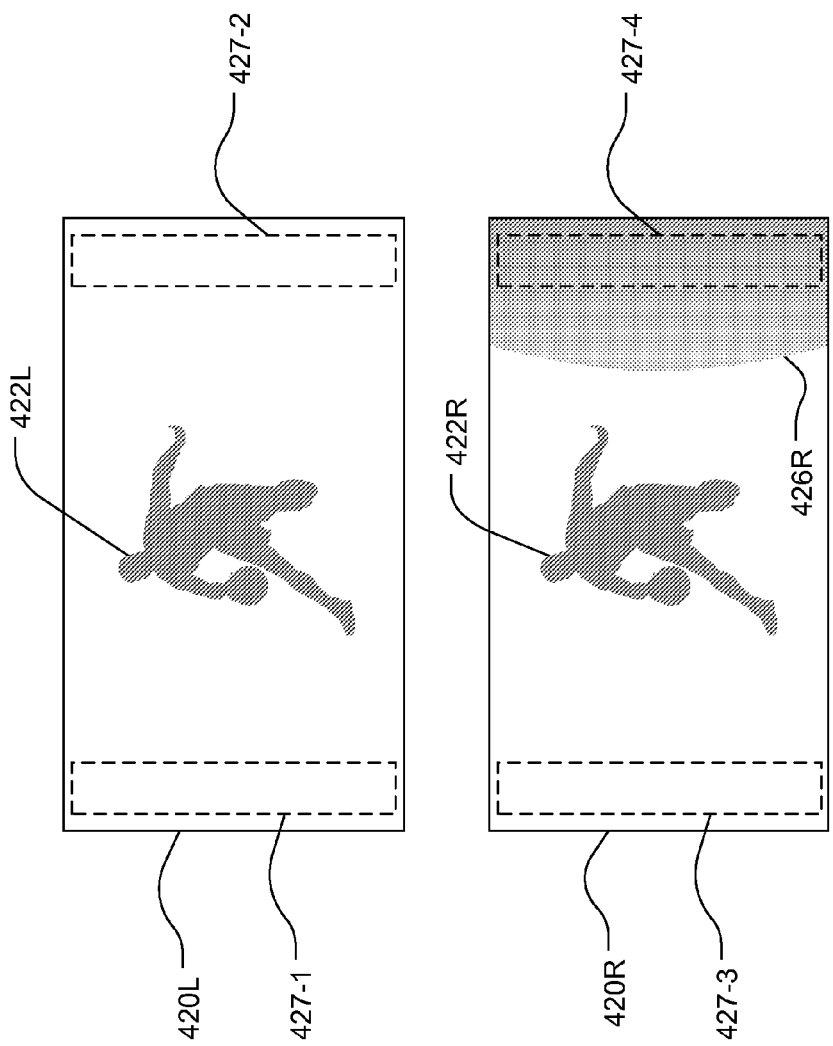
FIG. 4 is a representation of images captured by a stereographic camera.

Referring now to FIG. 4, an exemplary image 420L captured by a left camera is illustrated as displayed on a screen and an exemplary image 420R captured by a partially obstructed right camera is illustrated as displayed on a second screen. The images 420L and 420R include a primary subject 422 near the center of the display screen. The image 420R captured by the right camera includes the obstructing object 426R. Note that an object that partially obstructs the right camera will usually be located at the right side of the image captured by the right camera, and an object that obstructs the left camera (not shown in FIG. 4) will usually be located at the left side of the image captured by the left camera.

Since an object that obstructs the field of view of only one camera typically may be very close to the obstructed camera, the image 426R of the obstructing object may be out of focus and indistinct within the image 420R. The presence of the obstructing object 426R in the image 420R captured by the right camera may be detected by comparing portions of the content of the left and right images. For example, a first analysis window 427-1 and a second analysis window 427-2 may be defined near to the left and right edges, respectively, of the image 420L captured by the left camera. Similarly, a third analysis window 427-3 and a fourth analysis window 427-4 may be defined near to the left and right edges, respectively, of the image 420R captured by the right camera. The content of the first analysis window 427-1 and the content of the third analysis window 427-3 may be evaluated to determine if the left camera is partially obstructed. Similarly, the content of the second analysis window 427-2 and the content of the fourth analysis window 427-4 may be evaluated to determine if the right camera is partially obstructed.

The images 420L, 420R captured by the left camera and the right camera are not the same and there is no expectation that the content of the first analysis window 427-1 and the third analysis window 427-3 will be the same on a pixel-by-pixel basis. However, the content of the first analysis window 427-1 and the third analysis window 427-3 may be captured from generally the same area of the scene. Thus the contents of the first analysis window 427-1 and the third analysis window 427-3 may be statistically similar. Additionally, the first analysis window 427-1 and the third analysis window 427-3 may have similar spatial frequency content.

One or more comparable image metrics may be determined for the first analysis window 427-1 and the third analysis window 427-3. For example, the content of each pixel of a captured image may be defined by data including red-green-blue color components or by data including a luminance component and two color difference or chrominance components. The one or more image metrics may include, for example, a mean, a standard deviation, or a variance of a color data component, the luminance data component, and/or a chrominance data component calculated over the respective analysis window. For further example, a high pass spatial filter may be used to separate high spatial frequency contents of a color data component, the luminance data component, or a data component. The high spatial frequency content may be integrated over an analysis window to provide an image metric.

First image metrics may be calculated over the first analysis window 427-1 and comparable third image metrics may be calculated over the third analysis window 427-3. The first and third image metrics may then be compared to determine if the left camera is obstructed. In the example of FIG. 4, the first and third analysis windows 427-1, 427-3 contain images of the background scene. Calculated image metrics such as the standard deviation, variance, and high spatial frequency content of the image data may be similar for the first and third analysis windows, leading to a determination that the left camera is not obstructed.

Similarly, second and forth image metrics may be calculated over the second and fourth analysis windows 427-2, 427-4 and compared to determine if the right camera is obstructed. In the example of FIG. 4, the second analysis window 427-2 contains an image of the background scene, and the fourth analysis window 427-4 contains an image of an obstructing object close to the camera. Calculated image metrics such as the standard deviation, variance, and high spatial frequency content of the image data may be substantially different for the second and fourth analysis windows, leading to a determination that the right camera is obstructed.

Figure 5:
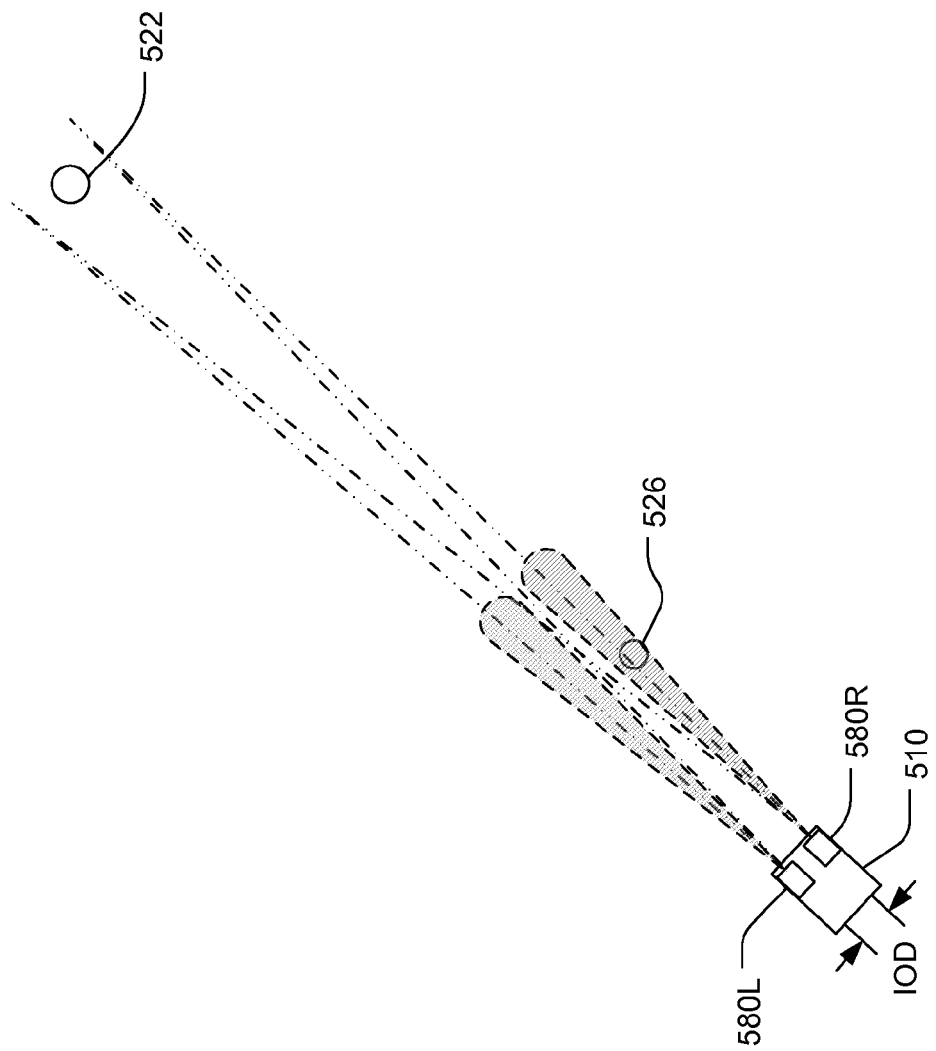
FIG. 5 a schematic view of a stereographic camera in an environment.

Referring now to FIG. 5, a stereographic camera 510, which may be the stereographic camera 110, may be used to capture live events such as sporting events. The stereographic camera 510 may be, for example, capturing a scene including a primary object 522 such as an athlete. A foreground object 526 may be positioned relative to the stereographic camera 510 such that the foreground object may obstruct a portion of field of view of the one of left and right cameras within the stereographic camera 510. In the example of FIG. 3, the object 526 may obstruct part of the field of view of a right camera.

Objects, such as the object 526, that obstruct the field of view of a left camera or a right camera of the stereoscopic camera system may be sensed using left and right obstruction sensors 580L, 580R within or coupled to the stereographic camera. The left obstruction sensor 580L may measure the distance to objects at the left edge of the field of view of the left camera and the right obstruction sensor 580R measure the distance to objects at the right edge of the field of view of the right camera. The field of view of one of the cameras may be considered to be obstructed if the respective obstruction sensor 580L, 580R determines that an object is within a predetermined distance of the camera.

The obstruction distance sensors 580L, 580R may be active sensors that transmit some type of energy, receive a portion of the energy reflected from one or more objects, and determine the distance to the object from a difference between the transmitted and received energy. For example, the obstruction sensors 580L, 580R may be time-of-flight sensors that emits pulses of optical, acoustic, ultrasonic, or radio frequency (RF) energy and determine the distance to objects from the elapsed time required for the emitted energy pulses to reflect from the objects and return to the sensor 580. For further example, the obstruction sensors 580L, 580R may transmit a frequency modulated continuous wave signal (FMCW) and determine the distance to an object by the instantaneous frequency difference between the transmitted signal and a received signal reflected from the object. The obstruction sensors 580L, 580R may be some other type of distance sensor or proximity sensor configured to provide data indicative of a distance from the stereographic camera 510 to a closest foreground object.

A stereographic camera system may sense obstructions using image processing as described in conjunction with FIG. 4, obstruction sensors as shown in FIG. 5, or a combination of image processing, obstruction sensors, and/or other techniques.

Figure 6:
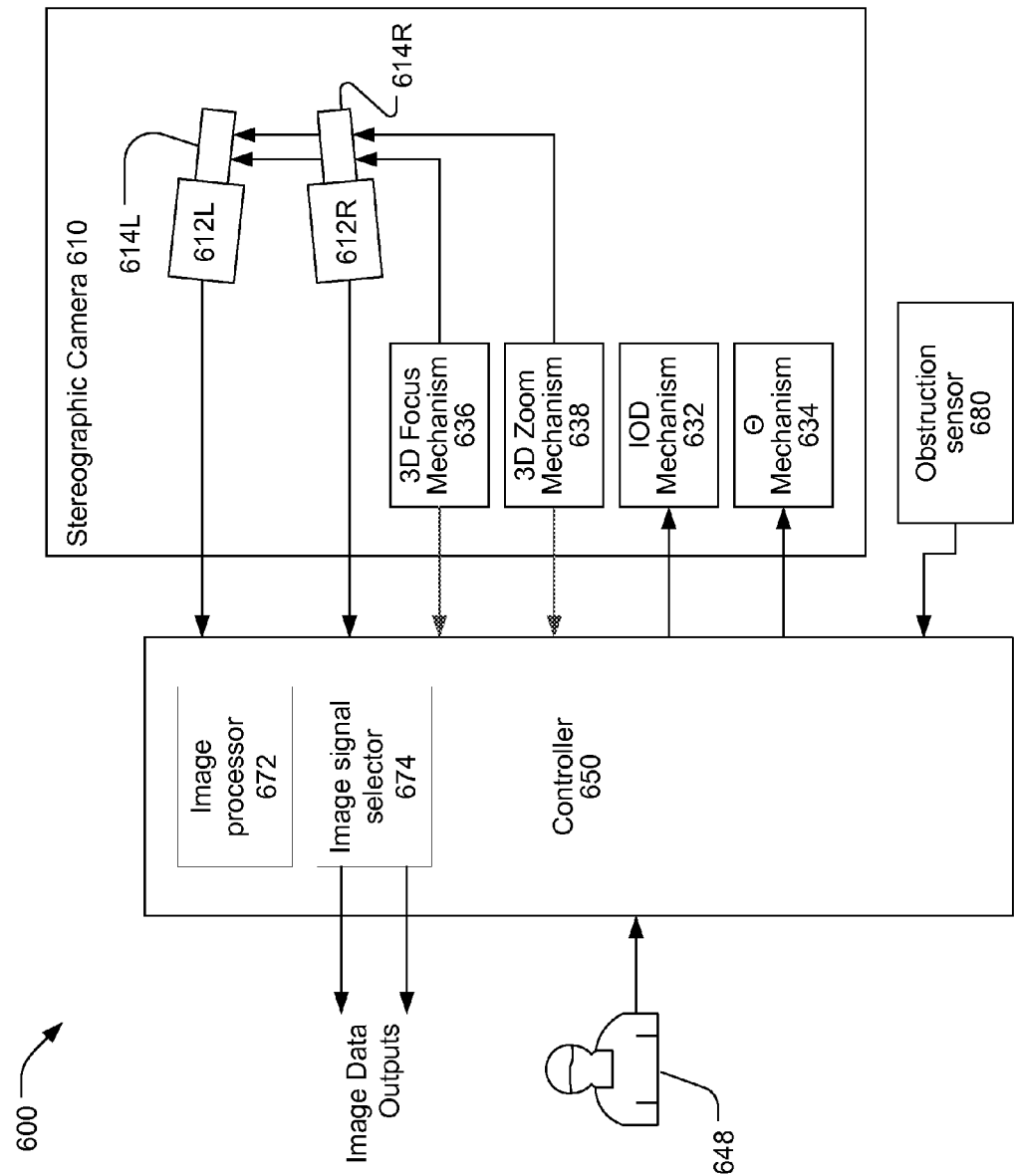
FIG. 6 is a block diagram of a stereographic camera.

Referring now to FIG. 6, a stereographic camera system 600, may include a stereographic camera 610 and an optional obstruction sensor 680 coupled to a controller 650. The obstruction sensor 680 may be included within the stereographic camera 610 or may be mounted on or coupled to the stereographic camera 610. The obstruction sensor 680 may sense a distance to a closest foreground object within or near the field of view of the stereographic camera 610.

The stereographic camera 610 may include a plurality of mechanisms to adjust the position and/or orientation of the left and right cameras 612L, 612R. The stereographic camera 610 may also include a focus mechanism 636 and a zoom mechanism 638 to synchronously adjust a focus distance and a focal length, respectively, of the left and right lenses 614L, 614R.

The stereographic camera 610 may include an IOD mechanism 632 to adjust an interocular distance between the left camera 612L and the right camera 612R. The stereographic camera 610 may include a Θ mechanism 634 to adjust a stereo convergence angle between the left camera 612L and the right camera 612R by pivoting one or both cameras about respective pivot axes. The IOD mechanism 632, and the Θ mechanism 634 may include one or more movable platforms or stages coupled to motors or other actuators. The IOD mechanism 632 and the Θ mechanism 634 may be adapted to set the interocular distance and the stereo convergence angle, respectively, in response to data received from the controller 650. Within this disclosure, the term "data" is intended to include digital data, commands, instructions, digital signals, analog signals, optical signals and any other data that may be used to communicate the value of a parameter such as interocular distance or convergence angle.

The focus mechanism 636 may synchronously adjust and set the focus distance of the lenses 614L, 614R. The focus mechanism 636 may include a mechanical, electronic, electrical, or electro-mechanical linkage between the lenses 614L, 614R to simultaneously adjust the focus distance of both lenses to the same value. The focus mechanism 636 may be manually actuated by a camera operator or assistant camera operator (commonly called a "focus puller") to set the focus distance. The focus mechanism 636 may include a sensor to send data indicative of the focus distance to the controller 650.

The zoom mechanism 638 may synchronously adjust and set the focal length of the lenses 614L, 614R. The zoom mechanism 638 may include a mechanical, electronic, electrical, or electro-mechanical linkage between the lenses 614L, 614R to simultaneously adjust the focal length of both lenses to the same value. The zoom mechanism 638 may be manually actuated by a camera operator to set the lens focal length. The zoom mechanism 638 may include a sensor to send data indicative of the focal length to the controller 650.

The controller 650 may also receive data from an operator 648, who may be for example a video engineer, indicating operating parameters for the stereographic camera 610. For example, the controller 650 may receive data from the operator 648 indicating a focus distance to convergence distance offset. The controller 650 may also receive data from the operator 648 indicating a desired interocular distance between the cameras 612L, 612R. Alternatively, the controller may automatically calculate a desired interocular distance based on the focus distance and focal length of the lenses 614L, 614R and scene characteristics. For example, the controller 650 may automatically calculate the desired interocular distance as described in copending patent application Ser. No. 12/578,488, entitled Stereo Camera With Automatic Control of Interocular Distance. In either case, the controller 650 may determine the required interocular distance IOD and convergence angle θ and send data indicating the interocular distance and convergence angle to the stereographic camera 610.

The controller 650 may receive data from the obstruction sensor 680 indicating the distance to the nearest foreground object within or near to the image frame of the stereographic camera 610. The controller 650 may determine, based on the data received from the obstruction sensor 680, whether or not the field of view of one of the left camera 612L and the right camera 612R is obstructed. The controller may contain an image signal selector 674. The controller 650 may, in response to the determination that the field of view of one of the left camera 612L and the right camera 612R is obstructed, automatically output only non-obstructed image data.

To automatically output only non-obstructed image data, the controller 650 may enter 2D mode and cause the stereographic camera to revert to a non-stereographic, or 2D, mode. In the 2D mode, the image signal selector 674 may select the image signal from only the non-obstructed one of the cameras 612L, 612R to be captured and sent to the image data outputs 673 for both of the viewer's eyes.

Alternatively, to automatically output only non-obstructed image data, the controller 650 may enter synthesize mode and synthesize non-obstructed image data to replace the obstructed image data of the obstructed of the cameras 612L, 612R. The controller 650 may then allow both the non-obstructed image signal from the non-obstructed one of the cameras 612L, 612R and the image signal from the obstructed one of the cameras 612L, 612R, with the obstructed image data replaced by synthesized image data, to be sent to the image data outputs 673.

Alternatively, the controller 650 may automatically output non-obstructed image data by entering one of the 2D mode and the synthesize mode previously described, in response to a selection parameter. The value of the selection parameter may be set in near-real time by the operator 648 or may be preset into the system controller 650 or may be determined algorithmically by the controller 650.

Figure 7:
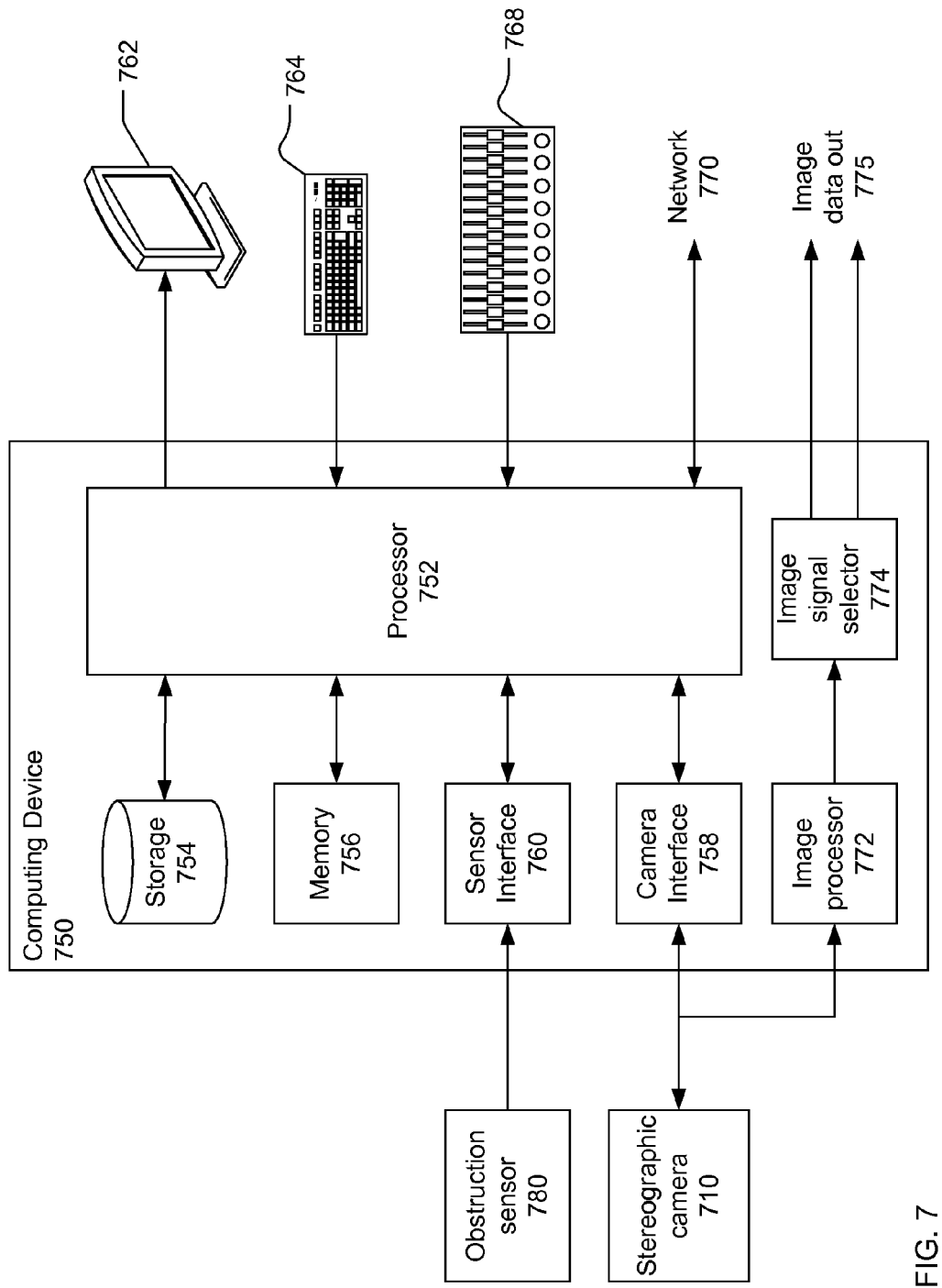
FIG. 7 is a block diagram of a computing device.

FIG. 7 is a block diagram of a computing device 750 that may be suitable for the controller 650. As used herein, a computing device refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. The computing device 750 may include hardware, firmware, and/ or software hosted on hardware and/or firmware adapted to perform the processes subsequently described herein. The computing device 750 may include a processor 752 coupled to a memory 756 and a storage device 754.

The storage device 754 may store instructions which, when executed by the processor 752, cause the computing device to provide the features and functionality of the controller 650. As used herein, a storage device is a device that allows for reading from and/or writing to a storage medium. Storage devices include hard disk drives, DVD drives, flash memory devices, and others. Each storage device may accept a storage media. These storage media include, for example, magnetic media such as hard disks, floppy disks and tape; optical media such as compact disks (CD-ROM and CD-RW) and digital versatile disks (DVD and DVD±RW); flash memory cards; and other storage media.

The computing device 750 may include or interface with a display device 762 and one or more input devices such a keyboard 764. The computing device 750 may include or interface with a camera operator interface 768, by which a camera operator may control, at least in part, the operation of one or more cameras. For example, the camera operator interface may be adapted to allow a camera operator or video engineer to enter 3D camera operating parameters including some or all of a focus distance to convergence distance offset, a maximum allowable disparity, and/or an interocular distance.

The computing device 750 may also include an interface with one or more networks 770. The computing device 750 may interface with the network 770 via a wired or wireless connection. The network 770 may be the Internet or any other private or public network.

The computing device 750 may also include a camera interface unit 758 to interface with a stereographic camera 710. The camera interface unit 758 may include a combination of circuits, firmware, and software to interface with the stereographic camera 710. The camera interface unit 758 may be coupled to the stereographic camera 710 via a network which may be a local area network; via one or more buses such as a USB bus, a PCI bus, a PCI Express bus, or other parallel or serial data bus; or via one or more direct wired or wireless connections. The camera interface unit 758 may be coupled to the stereographic camera 710 via a combination of one or more of direct connections, network connections, and bus connections.

The computing device 750 may also include a sensor interface unit 760 to interface with an obstruction sensor 780. The obstruction sensor 780 may, for example, include a left sensor to measure the distance to objects at the left edge of the field of view of a left camera and a right sensor to measure the distance to objects at the right edge of the field of view of a right camera. The sensor interface unit 760 may include a combination of circuits, firmware, and software to interface with the obstruction sensor 780. The computing device 750 may receive, from the obstruction sensor 780, data indicative of distances to closest foreground objects within the field of view of each of the left camera and the right camera of the stereographic camera 710. The computing device 750 may determine, based on the data received from the obstruction sensor 780, if either of the left camera and the right camera is obstructed. The computing device 750 may, in response to the determination that one of the left camera and right camera is obstructed, enter 2D mode and automatically output only non-obstructed image data by causing an image signal selector 774 to select the image signal from only the non-obstructed one of the cameras 612L, 612R to be output as the image data outputs 775 for both of the viewer's eyes.

Alternatively, the computing device 750 may, in response to the determination that one of the left camera and right camera is obstructed, enter synthesize mode and automatically output only non-obstructed image data by synthesizing non-obstructed image data to replace the obstructed image data of the obstructed one of the cameras 612L, 612R. The computing device 750 may then allow both the non-obstructed image signal from the non-obstructed one of the cameras 612L, 612R and the image signal from the obstructed of the cameras 612L, 612R, with the obstructed image data replaced by synthesized image data, to be output as the image data outputs 775.

Alternatively, the computing device 750 may, in response to the determination that one of the left camera and right camera is obstructed, automatically output only non-obstructed image data by entering one of the 2D mode and the synthesize mode previously described.

The sensor interface unit 760 may be coupled to the obstruction sensor 780 via a network which may be a local area network; via one or more buses such as a USB bus, a PCI bus, a PCI Express bus, or other parallel or serial data bus; or via one or more direct wired or wireless connections.

The processes, functionality and features of the computing device 750 may be embodied in whole or in part in software which may be in the form of firmware, an application program, an applet (e.g., a Java applet), a browser plug-in, a COM object, a dynamic linked library (DLL), a script, one or more subroutines, or an operating system component or service. The computing device 750 may run one or more software programs as previously described and may run an operating system, including, for example, versions of the Linux, Unix, MS-DOS, Microsoft Windows, Palm OS, Solaris, Symbian, and Apple Mac OS X operating systems. The hardware and software and their functions may be distributed such that some functions are performed by the processor 752 and others by other devices.

Description of Processes

Figure 8:
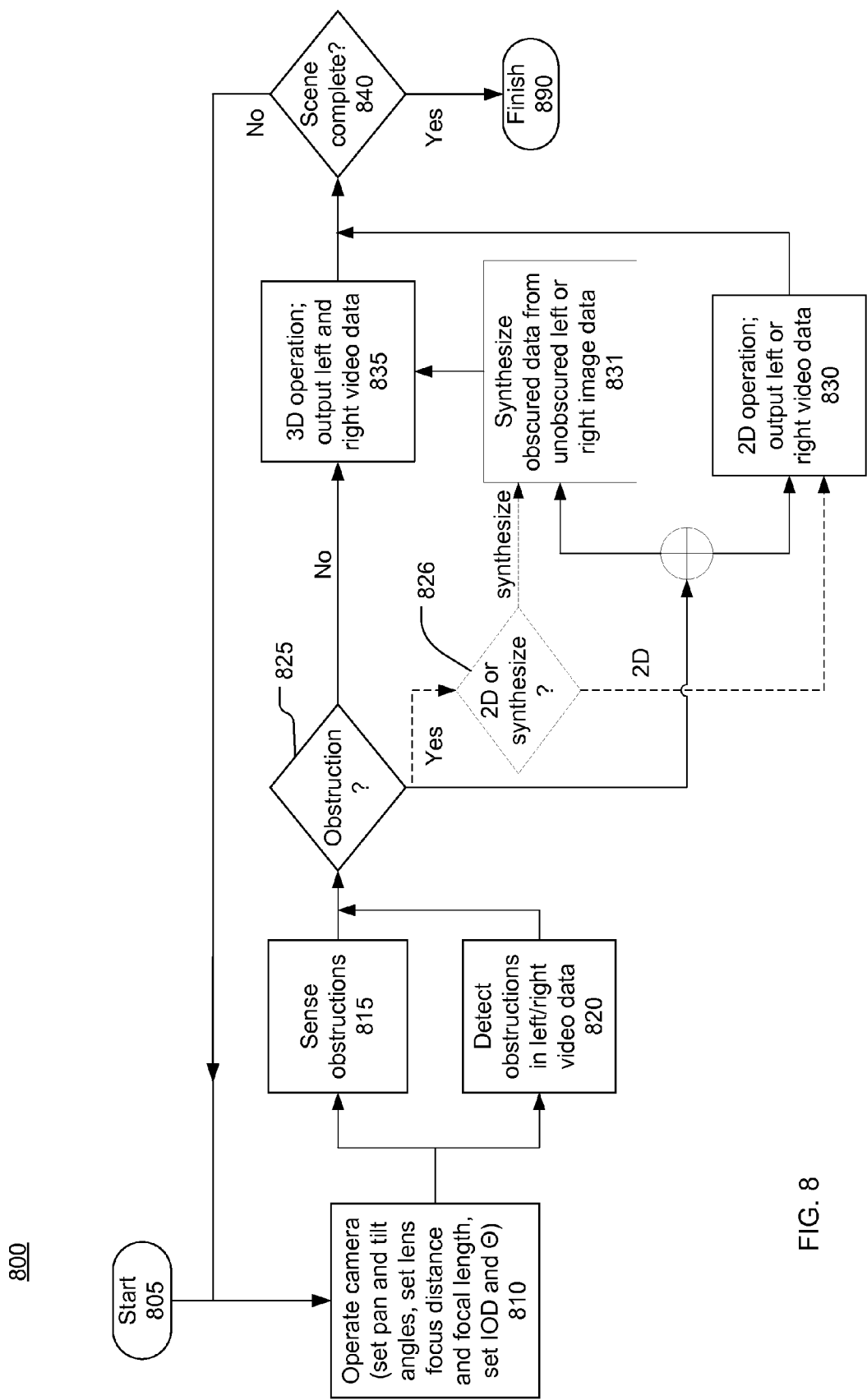
FIG. 8 is a flow chart of a process for operating a stereographic camera.

FIG. 8 is a flow chart of an exemplary process 800 for capturing stereoscopic images using a stereoscopic camera system with automatic obstruction detection such as the camera system 600. The flow chart of FIG. 8 has a start 805 and a finish at 890 when the recording of one or more scenes is complete. The process 800 is cyclic in nature, and the actions 810-840 may be repeated for each of a large plurality of scenes that may constitute, for example, a motion picture or television program. The process 800 is continuous in nature and the actions 810-840 within the process may be performed continuously and in near-real time during the recording of each scene. Within this disclosure, the phrase "near-real time" means in real time except for processing delays that are very short compared with temporal events in the scene being recorded.

At 810, a stereographic camera may be operated to capture a stereographic image of a scene or event. Operating the stereographic camera may include, for example, setting pan and tilt angles such that the stereographic camera is pointed toward a primary object to be captured, setting a lens focus distance such that left and right lenses of the stereographic camera are focused upon or near a primary scene object, and setting a focal length of the lenses to define a pleasing image frame around the primary object. The stereographic camera may be operated by one or more operators. For example, when capturing live events such as sporting events, the stereographic camera may be operated by a single cameraman. When recording a cinematic production, a head cameraman may control the pan and tilt angles and the lens focal length, and a focus puller may control the lens focus distance. In either case, the cameraman or another operator, such as a recording engineer, may control other parameters of the stereographic camera such as interocular distance IOD, convergence angle Θ and focus distance to convergence distance offset.

The stereographic camera may include an automatic focus subsystem that sets the focus distance of the lenses. An automatic focus subsystem may set the lens focus distance based on a sensor that measures the distance to a specific object with an image frame (typically the object in the center of the image). An automatic focus subsystem may set the lens focus distance by varying or dithering the lens focus distance while analyzing a selected portion of the image frame captured by the stereographic camera. The selected portion of the image frame may be set by an operator or may be determined automatically (for example by recognizing faces within the image frame).

At 815, objects that obstruct the field of view of a left camera or a right camera of the stereoscopic camera system may be sensed using obstruction sensors (such as the obstruction sensors 580L, 580R) within or coupled to the stereographic camera. The obstruction sensors may, for example, include a left sensor to measure the distance to objects at the left edge of the field of view of the left camera and a right sensor to measure the distance to objects at the right edge of the field of view of the right camera. The field of view of one of the cameras may be considered to be obstructed if the respective sensor determines that object is within a predetermined distance of the camera.

At 820, in addition to or instead of sensing obstructions at 815, obstructions may be detected by analysis of image signals provided by the left and right cameras. An exemplary technique for detecting obstructions from the left and right image signals will be discussed in further detail in conjunction with FIG. 9.

At 825, a determination may be made if the field of view of one of the left and right cameras is at least partially obstructed. When a determination is made at 825 that one of the left and right cameras is obstructed, the stereoscopic camera may switch to 2D (non-stereoscopic) operation at 830. Specifically, at 830 the image signal from the non-obstructed one of the left and right cameras may be selected and substituted for the image signal from the obstructed camera. In this case, when the image signals are displayed, both of a viewer's eyes will see identical images captured by the non-obstructed camera without any indication of depth.

Alternatively, when a determination is made at 825 that one of the left and right cameras is obstructed, the stereoscopic camera may switch to synthesize operation at 831. Specifically, at 831 the image signal from the non-obstructed one of the left and right cameras may be selected and the obstructed areas of the image signal from one of the left and right cameras may be synthesized from it. Alternatively, the obstructed areas of the image from one of the left and right cameras may be synthesized from the non-obstructed areas of the image from the same camera; which areas may be at least one of spatially and temporally near to the obstructed image areas, and substituted into the image signal from the obstructed camera. The method of obstructed image data synthesis is not critical to this disclosure beyond its ability to provide image data of sufficient fidelity such that the resultant image substantially resembles the image that would have resulted had the field of view been non-obstructed. The process 800 may revert to stereoscopic operation at 835 and output both the left and right image signals. In this case, when the image signals are displayed, both of a viewer's eyes will see different images. One image signal being captured from one of the left and right cameras and the other signal being an image signal composed of both captured image data from the other camera and synthesized image data.

Alternatively, when a determination is made at 825 that one of the left and right cameras is obstructed, a determination may be made at 826 whether the camera system will switch to 2D (non-stereoscopic) mode or to synthesize mode. The determination at 826 may be a made using a preset selection parameter, an operator selection or may be determined algorithmically.

When a determination is made at 825 that the fields of view of both the left and right cameras are non-obstructed, the process 800 may revert to stereoscopic operation at 835 and output both the left and right image signals. In this case, when the image signals are displayed, both of a viewer's eyes will see different images captured by the left and right cameras.

At 840, a determination may be made if the scene or event being captured has been completed. When the scene or event has not been completed, the process 800 may repeat from 810. The actions from 810 to 840 may be performed continuously and essentially simultaneously until the scene or event is completed. When the scene or event has been completed, the process may finish at 890.

Figure 9:
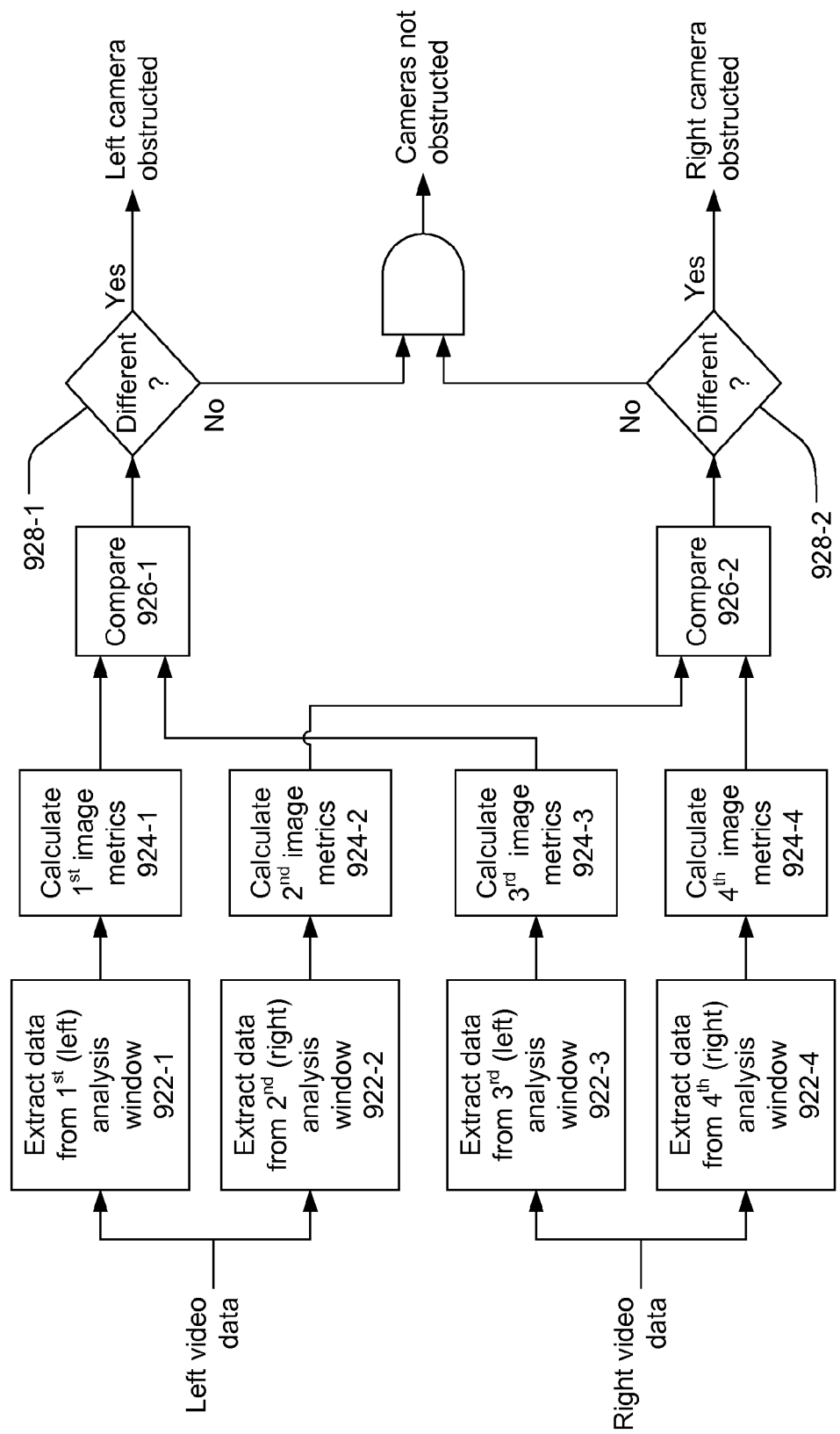
FIG. 9 is a flow chart of a process for processing image signals to detect an obstruction.

Referring now to FIG. 9, an exemplary process for detecting obstructions based on left and right image signals may be suitable for use at 820 in the process 800. At 922-1 and 922-2, image data within first and second analysis windows may be extracted from the left image signal. The first and second analysis windows may be located near to the left and right sides, respectively, of the image captured by a left camera. The first and second analysis windows may correspond, for example, to the analysis windows 427-1 and 427-2 shown in FIG. 4. At 922-3 and 922-4, image data within third and fourth analysis windows may be extracted from the right image signal. The third and fourth analysis windows may be located near to the left and right sides, respectively, of the image captured by a right camera. The third and fourth analysis windows may correspond, for example, to the analysis windows 427-3 and 427-4 shown in FIG. 4.

At 924-1, first image metrics may be calculated based on the data extracted from the first analysis window at 922-1. Similarly, at 924-2, 924-3, and 924-4, second, third, and fourth image metrics may be calculated based on data previously extracted from the second, third, and fourth analysis windows respectively. Each of the first, second, third and fourth image metrics may include one or more values calculated from the image data extracted from the respective analysis window. For example, each of the image metrics may include one or more of a mean, a standard deviation, a variance, and a high spatial frequency content of a color component, a luminance component, or a chrominance component of the extracted image data.

At 926-1, the first and third image metrics may be compared, which is to say that image metrics for the left side of the image captured by the left camera may be compared with image metrics for the left side of the image captured by the right camera. When the first and third image metrics each include a single value, the two values may be compared. Two values may be determined to be substantially different if the numerical difference between the values exceeds a predetermined threshold. When the first and third image metrics include multiple values, the corresponding values may be compared in pairs. The first and third image metrics may be determined to be substantially different, for example, if one pair of values, a majority of the pairs of values, or all of the pairs of values are substantially different. Alternatively, each set of image metrics may be considered as a vector and a distance between the two vectors may be calculated. The first and third image metrics may be determined to be substantially different if the distance exceeds a predetermined threshold.

At 926-2, the second and fourth image metrics may be compared, which is to say that image metrics for the right side of the image captured by the left camera may be compared with image metrics for the right side of the image captured by the right camera. The second and fourth image metrics may be compared using the method used to compare the first and third image metrics at 926-1.

At 928-1 a determination may be made if the left camera is obstructed. The left camera may be determined to be obstructed if the first image metrics and the third image metrics are substantially different. Similarly at 928-2, a determination may be made if the right camera is obstructed. The right camera may be determined to be obstructed if the second image metrics and the fourth image metrics are substantially different. When the first and third image metrics are not substantially different and (gate 929) the second and fourth image metrics are not substantially different, a determination may be made that the cameras are not obstructed.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

Within this description, the terms "unit" and "engine" mean a collection of hardware which may be augmented by firmware, and/or software. A "unit" may be on a larger scale than an "engine". For example, a unit may contain multiple engines, some of which may perform similar functions in parallel. The terms "engine" and "unit" do not imply any physical separation or demarcation. All or portions of one or more units and/or engines may be collocated on a common card, such as a network card 114, or within a common FPGA, ASIC, or other circuit device.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A stereoscopic camera system, comprising:
    a left camera and a right camera
    an obstruction detector to determine whether or not a field of view of one of the left camera and the right camera is at least partially obstructed
    a controller that causes the camera system to automatically switch to a non-stereoscopic mode, outputting only image data from a non-obstructed one of the left camera and the right camera, in response to the obstruction detector determining that a field of view of one of the left camera and the right camera is at least partially obstructed.

2. The stereoscopic camera system of claim 1, wherein the obstruction detector comprises:
    a left obstruction sensor and a right obstruction sensor to sense obstructions within the fields of view of the left camera and the right camera, respectively.

3. The stereoscopic camera system of claim 2, wherein
    each of the left and right obstruction sensors senses a distance to a nearest object within the field of view of the respective camera
    the field of view of each of the left and right camera is determined to be obstructed if the distance to the nearest object within the field of view is less than a predetermined minimum distance.

4. The stereoscopic camera system of claim 1, the obstruction detector further comprising:
    an image processor to detect obstructions by analyzing at least some image data from the left camera and the right camera.

5. The stereoscopic camera system of claim 4, wherein the image processor performs actions comprising:
  determining whether or not the left camera is obstructed by comparing image data from the left side of an image captured by the left camera and image data from the left side of an image captured by the right camera
  determining whether or not the right camera is obstructed by comparing image data from the right side of the image captured by the left camera and image data from the right side of the image captured by the right camera.

6. A stereoscopic camera system, comprising:
  a left camera and a right camera
  an image processor to determine whether or not a field of view of one of the left camera and the right camera is at least partially obstructed, the image processor performing actions comprising:
    computing first image metrics across a first analysis window near to a left side of a field of view of the left camera
    computing second image metrics across a second processing window near to a right side of the field of view of the left camera
    computing third image metrics across a third processing window near to a left side of a field of view of the right camera
    computing fourth image metrics across a fourth processing window near to a right side of the field of view of the right camera
    determining the left camera is obstructed if the first image metrics are substantially different from the third image metrics
    determining the right camera is obstructed if the fourth image metrics are substantially different from the second image metrics
  a controller that causes the camera system to automatically output only non-obstructed image data, in response to the image processor determining that a field of view of one of the left camera and the right camera is at least partially obstructed.

7. The stereoscopic camera system of claim 6, wherein the first, second, third, and fourth image metrics each include at least one of, a mean, a standard deviation, a variance, and a high spatial frequency content of at least one of, a color component, a luminance component, and a chrominance component of the image data within the respective processing window.

8. A method of operating a stereoscopic camera including a left camera and a right camera, the method comprising:
  determining whether or not a field of view of one of the left camera and the right camera is at least partially obstructed
  automatically switching the stereoscopic camera to a non-stereoscopic mode, outputting only image data from a non-obstructed one of the left camera and the right camera, in response to a determination that a field of view of one of the left camera and the right camera is at least partially obstructed.

9. The method of claim 8, wherein determining whether or not a field of view of one of the left camera and the right camera is at least partially obstructed further comprises:
  sensing obstructions within the fields of view of the left camera and the right camera with a left obstruction sensor and a right obstruction sensor, respectively.

10. The method of claim 9, wherein
  each of the left and right obstruction sensors senses a distance to a nearest object within the field of view of the respective camera the field of view of each of the left and right camera is determined to be obstructed if the distance to the nearest object within the respective field of view is less than a predetermined minimum distance.

11. The method of claim 8, wherein determining whether or not a field of view of one of the left camera and the right camera is at least partially obstructed further comprises:
  analyzing at least some image data from the left camera and the right camera.

12. The method of claim 11, wherein analyzing at least some image data further comprises:
  determining whether or not the left camera is obstructed by comparing image data from the left side of an image captured by the left camera and image data from the left side of an image captured by the right camera
  determining whether or not the right camera is obstructed by comparing image data from the right side of the image captured by the left camera and image data from the right side of the image captured by the right camera.

13. A method of operating a stereoscopic camera including a left camera and a right camera, the method comprising:
  computing first image metrics across a first analysis window near to a left side of a field of view of the left camera
  computing second image metrics across a second processing window near to a right side of the field of view of the left camera
  computing third image metrics across a third processing window near to a left side of a field of view of the right camera
  computing fourth image metrics across a fourth processing window near to a right side of the field of view of the right camera
  determining the left camera is obstructed if the first image metrics are substantially different from the third image metrics
  determining the right camera is obstructed if the fourth image metrics are substantially different from the second image metrics
  automatically outputting only non-obstructed image data in response to a determination that a field of view of one of the left camera and the right camera is at least partially obstructed.

14. The method of claim 13, wherein the first, second, third, and fourth image metrics each include at least one of, a mean, a standard deviation, a variance, and a high spatial frequency content of at least one of, a one color component, a luminance component, and a chrominance component of the image data within the respective processing window.

15. A computing device, comprising:
  a processor
  memory coupled to the processor
  a camera interface for connection to a stereoscopic camera
  a storage device coupled to the processor, the storage device storing instructions which, when executed by the processor, cause the computing device to perform actions including:
    receiving, via the camera interface, left image data and right image data
    determining, based on the left image data and the right image data, whether or not a field of view of one of the left camera and the right camera is at least partially obstructed
    automatically switching the stereoscopic camera to a non-stereoscopic mode, outputting only image data from a non-obstructed one of the left camera and the right camera, in response to a determination that a field of view of one of the left camera and the right camera is at least partially obstructed.

16. The computing device of claim 15, wherein determining whether or not a field of view of one of the left camera and the right camera is at least partially obstructed further comprises:
   determining whether or not the left camera is obstructed by comparing image data from the left side of an image captured by the left camera and image data from the left side of an image captured by the right camera
   determining whether or not the right camera is obstructed by comparing image data from the right side of the image captured by the left camera and image data from the right side of the image captured by the right camera.

17. A computing device, comprising:
   a processor
   memory coupled to the processor
   a camera interface for connection to a stereoscopic camera
   a storage device coupled to the processor, the storage device storing instructions which, when executed by the processor, cause the computing device to perform actions including
      receiving, from the stereoscopic camera via the camera interface, left image data and right image data
      computing first image metrics across a first analysis window near to a left side of a field of view of the left camera
      computing second image metrics across a second processing window near to a right side of the field of view of the left camera
      computing third image metrics across a third processing window near to a left side of a field of view of the right camera
      computing fourth image metrics across a fourth processing window near to a right side of the field of view of the right camera
      determining the left camera is obstructed if the first image metrics are substantially different from the third image metrics
      determining the right camera is obstructed if the fourth image metrics are substantially different from the second image metrics
      automatically outputting only non-obstructed, in response to a determination that a field of view of one of the left camera and the right camera is at least partially obstructed.

18. The computing device of claim 17, wherein the first, second, third, and fourth image metrics each include at least one of, a mean, a standard deviation, a variance, and a high spatial frequency content of at least one of, a color component, a luminance component, and a chrominance component of the image data within the respective processing window.

* * * * *